US010348348B2

(12) United States Patent
Sangameswaran et al.

(10) Patent No.: US 10,348,348 B2
(45) Date of Patent: Jul. 9, 2019

(54) METHOD AND APPARATUS FOR VEHICLE MESSAGE ROUTING

(71) Applicant: FORD GLOBAL TECHNOLOGIES, LLC, Dearborn, MI (US)

(72) Inventors: Sangeetha Sangameswaran, Canton, MI (US); Jason Michael Miller, Woodhaven, MI (US); Eric Ramsay Paton, Sylvan Lake, MI (US); John William Schmotzer, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 94 days.

(21) Appl. No.: 15/450,781

(22) Filed: Mar. 6, 2017

(65) Prior Publication Data

US 2018/0254790 A1 Sep. 6, 2018

(51) Int. Cl.
*H04B 1/3822* (2015.01)
*H04L 12/40* (2006.01)

(52) U.S. Cl.
CPC .. *H04B 1/3822* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| 4,709,327 A * | 11/1987 | Hillis ................. G06F 15/8023 |
| | | 711/150 |
| 2010/0180062 A1* | 7/2010 | Hidaka ............... G06F 13/4022 |
| | | 710/314 |
| 2013/0166778 A1 | 6/2013 | Ishigooka et al. |
| 2014/0379954 A1 | 12/2014 | Hayashi |
| 2015/0207858 A1 | 7/2015 | de Bes |

\* cited by examiner

*Primary Examiner* — Kevin C. Harper
*Assistant Examiner* — Derrick V Rose
(74) *Attorney, Agent, or Firm* — Frank Lollo; Brooks Kushman P.C.

(57) ABSTRACT

A system includes a processor configured to route a telematics message to all networks not pre-identified as backbone networks in response to a directionality bit, included in a CAN identifier, indicating non-backbone routing. The processor is also configured to route the telematics message to any pre-identified backbone networks in response to the directionality bit indicating backbone routing.

20 Claims, 4 Drawing Sheets

US 10,348,348 B2

METHOD AND APPARATUS FOR VEHICLE MESSAGE ROUTING

TECHNICAL FIELD

The illustrative embodiments generally relate to methods and apparatuses for vehicle message routing.

BACKGROUND

Modern vehicles come equipped with complicated electronics systems that control numerous aspects of the driving experience. These systems are capable of cross-communication, as well as communication with vehicle sensors and other data providers. Such communication typically occurs over one or more vehicle controller area network (CAN) BUSSES.

Since there are a large number of electronic control units (ECUs) provided to many vehicles on the road, it is common to have multiple BUSSES in a single vehicle. Routing signals between these BUSSES often relies on a database, identifying which ECU is on which vehicle BUS. BUS communication occurs by putting a data signal on a network, and then the particular ECU to which the signal applies actually chooses the data signal, and the other ECUs on the network ignore the signal. That is, signals are not necessarily sent directly to a module address, which is why the database of which ECUs are on which networks can be useful.

The above schema may commonly be used for certain CAN messages, but in other instances the CAN messages may simply be widely broadcast to all vehicle networks, to ensure an intended module receives the message. The illustrative embodiments propose improvements to both methodologies.

SUMMARY

In a first illustrative embodiment, a system includes a processor configured to route a telematics message to all networks not pre-identified as backbone networks in response to a directionality bit, included in a CAN identifier, indicating non-backbone routing. The processor is also configured to route the telematics message to any pre-identified backbone networks in response to the directionality bit indicating backbone routing.

In a second illustrative embodiment, a system includes a processor configured to route a telematics message to all networks not pre-identified as backbone networks in response to a directionality bit, included in a CAN identifier as a designated bit of either a source or target identifier, indicating non-backbone routing. The processor is also configured to route the telematics message to any pre-identified backbone networks in response to the directionality bit indicating backbone routing.

In a third illustrative embodiment, a system includes a processor configured to route a telematics message to all networks not pre-identified as backbone networks in response to a target address, included in a CAN identifier, not corresponding to a target module address predetermined to reside on one of the pre-identified backbone networks. The processor is also configured to route the telematics message to any pre-identified backbone networks in response to the target address corresponding to the target module address predetermined to reside on the backbone.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
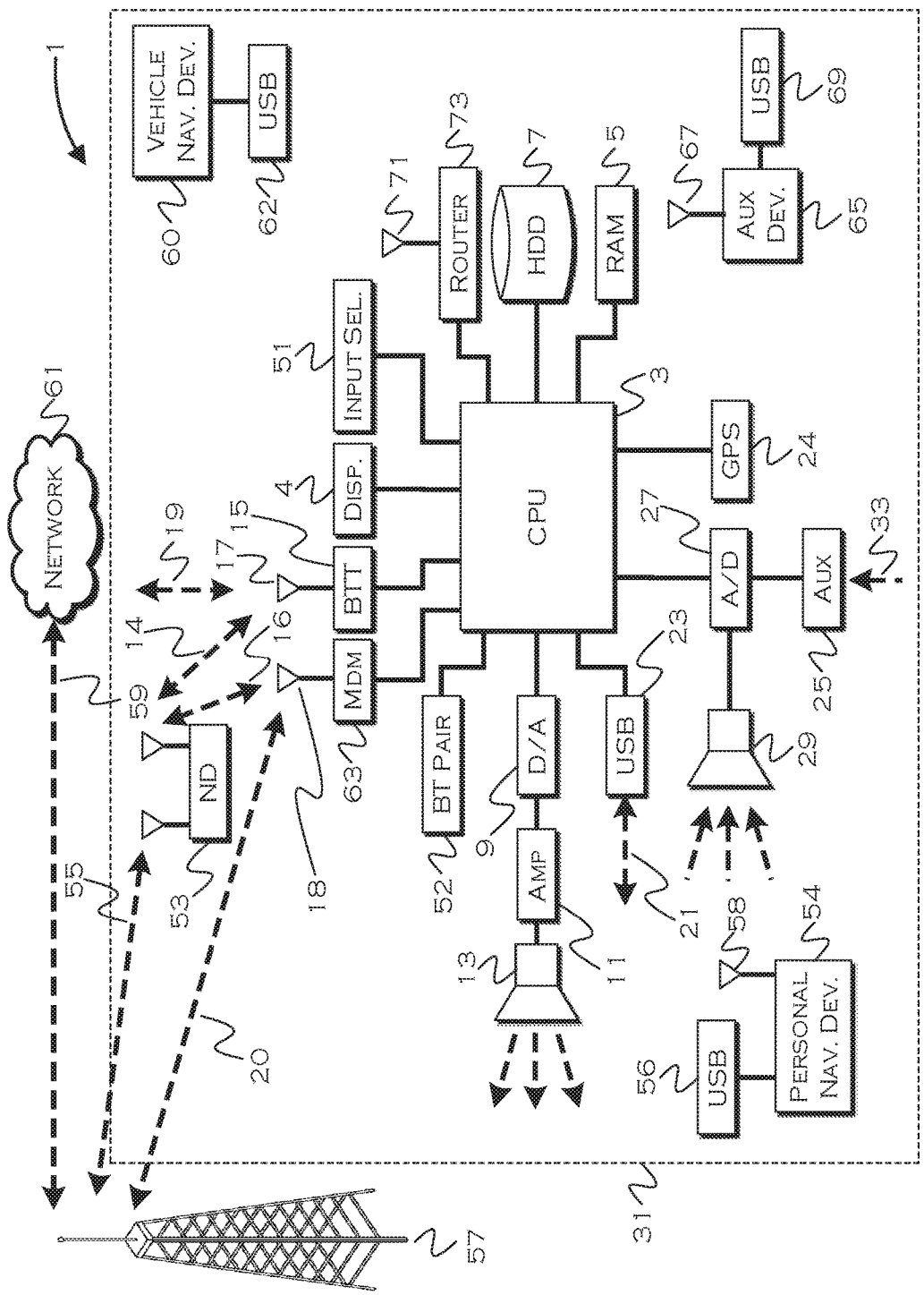
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a Wi-Fi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., Wi-Fi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

For much telematics communication in a vehicle, the communication exists between a connectivity module and a non-connectivity module. In an architecture where the connectivity modules, such as an infotainment system module having local wireless communication capability and a telematics control unit (TCU) module having long range communication capability, are on one BUS and the non-connectivity modules are on another BUS or other BUSSES, the connectivity BUS can be considered the backbone. An example of such an architecture is shown with respect to FIG. 2.

In systems where the infotainment module is on one BUS and the TCU module is on another BUS, the system essentially has two backbones, and configuration to adopt the various strategies outlined herein would change. More will be said on this subject once the routing strategies have been discussed.

Figure 2:
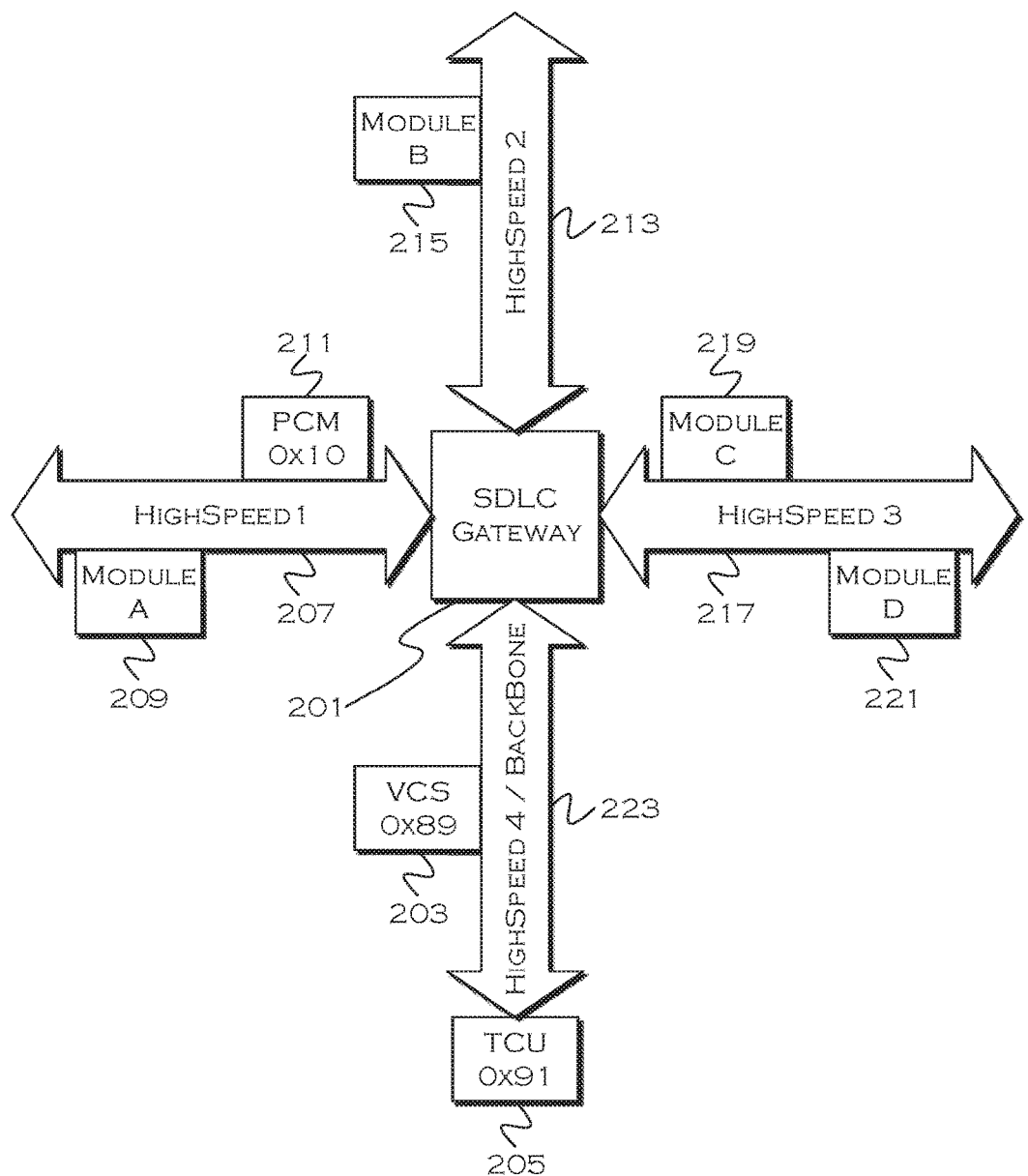
FIG. 2 shows an illustrative BUS architecture.

FIG. 2 shows an illustrative BUS architecture. In this illustrative example, the system includes a smart data link connector (SDLC) Gateway 201, which handles request routing between various ECUs. This system includes four illustrative BUSSES, HighSpeed (HS) BUS 207, HS BUS 213, HS BUS 217 and HS BUS 223.

HS BUS 223 is the backbone of this network, since both the vehicle computing system (infotainment computer/VCS) 203 and the TCU 205 connect to this BUS. Modules may have limited addressability on a BUS, to help identify which module should receive a given message on the BUS. The address will be included in data placed on the BUS, and the particular module to which the data is addressed will retrieve the data from the BUS.

In this example, HS BUS 207 includes module A 209 and powertrain control module 211, HS BUS 213 includes module B 215 and HS BUS 217 includes modules C 219 and D 221.

The illustrative embodiments present examples of 29 bit controller area network (CAN) IDs which contain information such as priority, application identifiers, directionality, target and source identification. Four different routing solutions are presented as examples of solutions that can be used to route telematics requests when the architecture is as described in FIG. 2 (both connectivity modules share a BUS).

Figure 3:
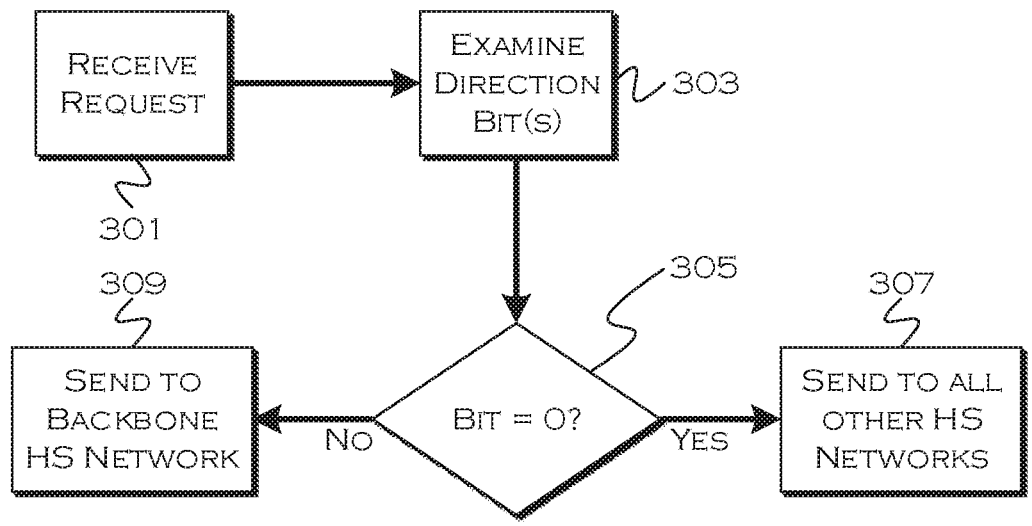
FIG. 3 shows an illustrative first routing strategy process.

FIG. 3 shows an illustrative first routing strategy process. In this illustrative example, the 29 bit CAN identifier is allocated as follows:

| Priority | Reserved | App | Direction | Target | Source |
|---|---|---|---|---|---|
| 3 bits 110 | 2 bits 11 | 3 bits 000-111 | 1 bit 0-1 | 10 bit 0x000-0x3FF | 10 bit 0x000-0x3FF |

-continued

| Priority | Reserved | App | Direction | Target | Source |
|---|---|---|---|---|---|
| | | | 0 = "request" | Will align with DoIP | Will align with DoIP |
| | | | 1 = "response" | Will align with GMRDB | Will align with GMRDB |

In this example, the process receives a request/response at the SDLC/Gateway 301. Typically, routing is done by the SDLC/Gateway, so requests or responses are usually handled by the gateway, even if explicit mention of the gateway is not made with respect to each instance of a request or response. In the current 11 bit CAN identifier model, the gateway uses a global master reference database (GMRDB) of ECU locations (which BUSSES, among other things) for routing. In the 29 bit model presented, the system can route the message in the absence of a database and route messages for which the database was not intended.

In this example, the 29 bit CAN identifiers are used for telematics messages, so the directionality is either "0" for a request (coming from the connectivity backbone) or "1" for a response (going to the connectivity backbone). The process examines the directionality bit 303 and determines based on whether the bit is "0" (for example) 305. If the bit indicates a response (1, in this example), the process sends the data associated with the identifier (and the identifier) to the backbone network, since the data is a response to a connectivity module located on the backbone.

If the bit is "0," then the data is a request (in this example), and the SDLC/gateway sends the data to all other networks. For purposes of illustration, limited module addressing is also shown in FIG. 2, with 0x91 being the TCU module, 0x89 being the VCS/infotainment module and 0x10 being the PCM.

Some example request/responses are as follows:
A request from the TCU to the PCM would use a target of 0x10 (the PCM) a source of 0x91 (the TCU) and a direction of 0 (request, being sent to all non-backbone modules).

A response from the PCM to the TCU would use a source of 0x10, a target of 0x91 and a direction of 1.

A request from the TCU to the VCS would use a target of 0x89, a source of 0x91 and a direction of 0 (since both modules are on the same HS CAN).

A response from the VCS to the TCU would use a source of 0x89, a target of 0x91 and a direction of 1.

Thus, in this example, the directionality bit allows for simple determinations as to whether or not to route a request to a backbone network including connectivity modules or another network containing non-connectivity ECUs.

Figure 4:
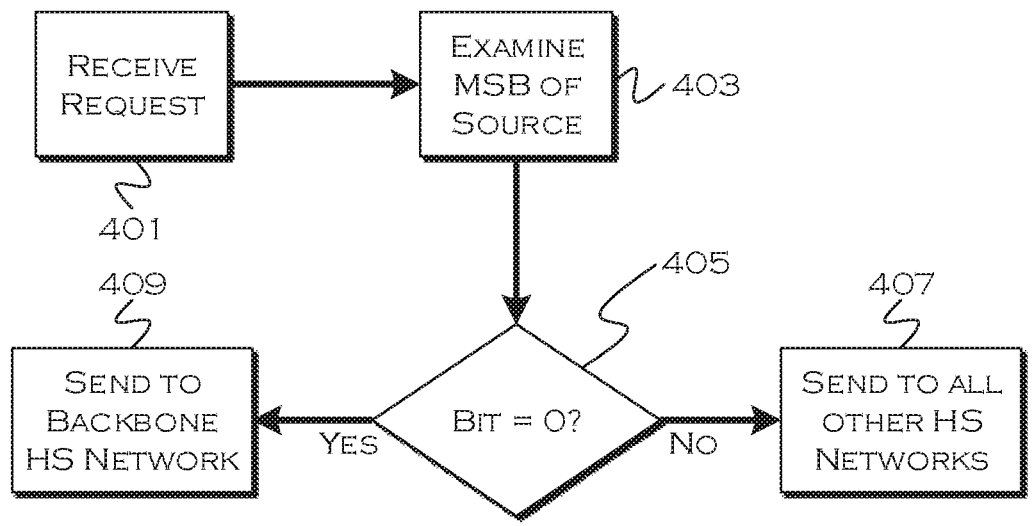
FIG. 4 shows an illustrative second routing strategy process.

FIG. 4 shows an illustrative second routing strategy process. In this illustrative example, the 29 bit CAN identifier is allocated as follows:

| Priority | Reserved | App | Target | Source |
|---|---|---|---|---|
| 3 bits 110 | 3 bits 111 | 3 bits 000-111 | 10 bit 0x000-0x3FF Will align with DoIP Will align with GMRDB | 10 bit 0x000-0x3FF Will align with DoIP Will align with GMRDB |

Here, there is no longer a directionality bit, and instead the process use an upper bit of a source identifier to determine if data associated with a 29 bit identifier is a request or response. Accordingly, when the gateway receives data 401, it examines the most significant bit (MSB) of the source identifier 403 (or target identifier, or both, but technically one or the other can be used whilst disregarding the counterpart since directionality can be observed from a single bit).

Some example request/responses (the same examples as above, to show the variation in bit utilization) are as follows:

A request from the TCU to the PCM would use a target of 0x10 (the PCM) and a source of 0x291 (the TCU). The value of the upper bit (nibble) of the source identifier as "2" (an illustrative value) indicates that this is a request (to be routed to non-backbone networks). The example shown determines if the most significant bit is "0" 405 and then routes to the backbone 409 if this is true and to all other networks 407 if this bit is non-zero. An A response from the PCM to the TCU would use a source of 0x10 and a target of 0x291. While the target bit includes a directional identifier in this example, it is worth noting that a most significant bit (MSB) of only one of the source or target may be used in this model (depending on preferred paradigm). Thus, it is also possible to exclude the MSB designator on whichever one of the two (source/target) is not being used for directionality.

A request from the TCU to the VCS would use a target of 0x89 and a source of 0x291. The MSB of "2" in this example would cause the request to be route to other networks, even though both modules are on the same HS CAN. This ensures full coverage when a message sender is unsure of the fact that both modules are on the same bus. Since the local target module (on the same bus) would have received the request anyhow as the request was transmitted to the gateway, this strategy does not present the proper module from receiving the message, even though the gateway routes the message to other CAN networks not including the target module (a fact of which the gateway is, initially at least, unaware).

A response from the VCS to the TCU would use a source of 0x89 and a target of 0x91.

Thus, in this example, using an upper bit of a target or source effectively gives a 9 bit identifier availability for the target/source addresses.

Figure 5:
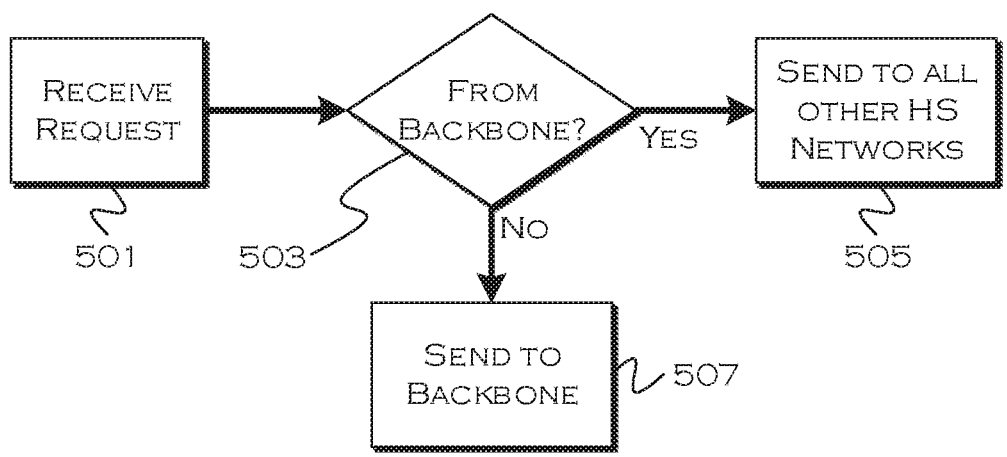
FIG. 5 shows an illustrative third routing strategy process.

FIG. 5 shows an illustrative third routing strategy process. In this illustrative example, the 29 bit CAN identifier is allocated as follows:

| Priority | Reserved | App | Target | Source |
|---|---|---|---|---|
| 3 bits | 3 bits | 3 bits | 10 bit | 10 bit |
| 110 | 111 | 000-111 | 0x000-0x3FF | 0x000-0x3FF |
| | | | Will align with DoIP | Will align with DoIP |
| | | | Will align with GMRDB | Will align with GMRDB |

In this example, there is no explicit direction bit (example shown in FIG. 3) or implied direction bit (example shown in FIG. 4). In this example, the SDLC/Gateway routes all received frames (which wee not also transmitted by the gateway) from the backbone to other networks, and all received frames (again, those not transmitted by the gateway) from all other networks to the backbone.

In this example, the process receives a request 501 for transmission to another ECU. If the request is from the backbone (or a backbone) 503, the process sends the request to all non-backbone networks 505 (and possibly other backbones, if more than one). If the request is from a non-backbone network, the process routes the request onto the backbone(s) 507.

Since the ECUs on the same CAN bus as the source can receive the request while it is transmitted to the gateway (i.e., they can pick it off the bus), there is not a need to route the request back onto the backbone, for example, if the request is from one backbone entity to another. The above paradigm should ensure that at least backbone 4 other and other 4 backbone requests are successfully transmitted and received by the appropriate entities. In this example, the only data the system needs to know is which CAN bus represents the backbone(s).

Figure 6:
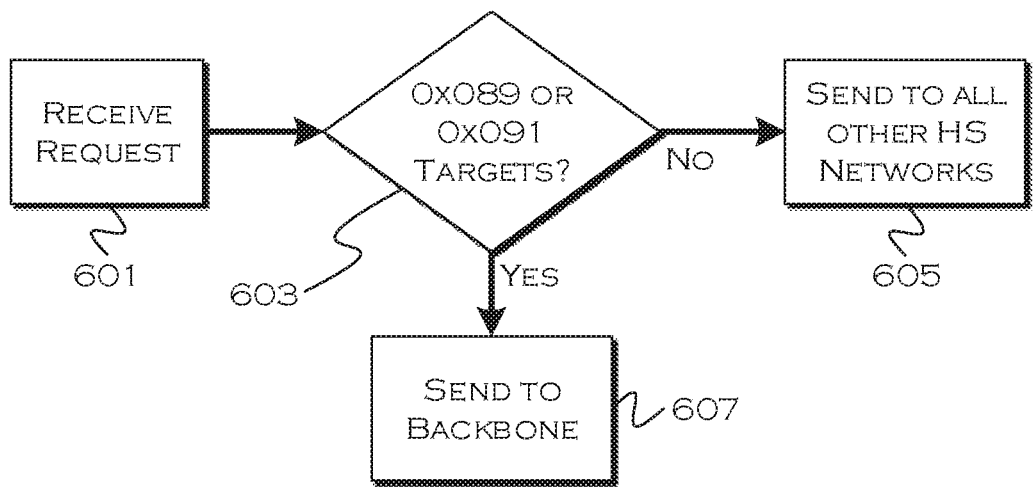
FIG. 6 shows an illustrative fourth routing strategy process.

FIG. 6 shows an illustrative fourth routing strategy process. In this example, the process hardcodes or configures the allowed clients that could be/are on a backbone. This uses preconfigured identifiers for the client ECUs on the backbone (such as VCS and TCU ECUs). Here, the SDLC/Gateway routes any frames with the full address values in the target field to the backbone, and any frames with these address values in the source field to the other non-backbone networks. This may include a predefinition of the addresses of the particular modules, whereas the other options allow for dynamically changing addresses based on differing vehicles, since the routing is done based on values other than the discrete ECU addresses.

Here, for example, ECUs (such as the TCU or VCS) are given explicit, fixed identifiers (in this example, 0x89 and 0x91). These modules are also placed on a backbone network by the OEM. Any received request 601 that a gateway process receives checks to see if the target corresponds to the fixed identifiers 603 (here 0x89 or 0x91). If so, the request is routed onto the designated backbone 607. All other requests are sent to all non-backbone HS networks.

The illustrative embodiments allow for more flexibility in module placement with regards to various vehicle busses. Since a gateway module is not looking up bus identifiers with each request, and instead uses 29-bit CAN identifier data to route the requests, there is not a need to fixedly place each ECU on a known bus and pre-identify the placement. Knowing simply which network is the backbone (contains the core important modules for a particular need) will allow a gateway process to effectively route messages between at least the core modules and all other requesting modules, without actually knowing the addresses and/or networks of most of the modules.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
    a vehicle-based processor configured to:
        route a telematics message to all networks not pre-identified as backbone networks in response to a directionality bit, included in a CAN identifier, indicating non-backbone routing; and
        route the telematics message to any pre-identified backbone networks in response to the directionality bit indicating backbone routing.

2. The system of claim 1, wherein each of the networks pre-identified as backbone networks contains at least one specified backbone module and wherein each of the networks not pre-identified as backbone networks does not contain at least one specified backbone module.

3. The system of claim 2, wherein the at least one specified backbone module is a telematics control unit.

4. The system of claim 2, wherein the at least one specified backbone module is an infotainment module.

5. The system of claim 1, wherein the routing is source agnostic with regards to a source module identifier included in the CAN identifier.

6. The system of claim 1, wherein the routing is target agnostic with regards to a target module identifier included in the CAN identifier.

7. The system of claim 1, including the networks pre-identified as backbone networks, wherein the processor is configured to route a request from a first of the networks pre-identified as backbone networks to other of the networks pre-identified as backbone networks in response to the directionality bit indicating backbone routing.

8. A system comprising:
a vehicle-based processor configured to:
route a telematics message to all networks not pre-identified as backbone networks in response to a directionality bit, included in a CAN identifier as a designated bit of either a source or target identifier, indicating non-backbone routing; and
route the telematics message to any pre-identified backbone networks in response to the directionality bit indicating backbone routing.

9. The system of claim 8, wherein the backbone is identified as a network containing at least one specified backbone module.

10. The system of claim 9, wherein the specified backbone module is a telematics control unit.

11. The system of claim 9, wherein the specified backbone module is an infotainment module.

12. The system of claim 8, wherein the routing is source agnostic, with regards to any bits other than the directionality bit of the source identifier included in the 29-bit CAN identifier if the directionality bit is included in the source identifier.

13. The system of claim 12, wherein the routing is source agnostic with regards to the source identifier if the directionality bit is included in the target identifier.

14. The system of claim 8, wherein the routing is target agnostic, with regards to any bits other than the directionality bit of target identifier included in the 29-bit CAN identifier if the directionality bit is included in the target identifier.

15. The system of claim 14, wherein the routing is target agnostic with regards to the target identifier if the directionality bit is included in the source identifier.

16. The system of claim 8, including a plurality of identified backbone networks and wherein the processor is configured to route a request from a first of the plurality of backbone networks to all backbone networks in response to the directionality bit indicating backbone routing.

17. A system comprising:
a vehicle-based processor configured to:
route a telematics message to all networks not pre-identified as backbone networks in response to a target address, included in a CAN identifier, not corresponding to a target module address predetermined to reside on one of the pre-identified backbone networks; and
route the telematics message to any pre-identified backbone networks in response to the target address corresponding to the target module address predetermined to reside on the backbone.

18. The system of claim 17, wherein the target module address is an address of a telematics control unit or an infotainment module.

19. The system of claim 17, wherein the routing is source agnostic with regards to a source identifier included in the 29-bit CAN identifier.

20. The system of claim 17, including a plurality of identified backbone networks and wherein the processor is configured to route a request from a first of the plurality of backbone networks to all backbone networks in response to the target address corresponding to a target module address predetermined to reside on any of the pre-identified backbone networks.

* * * * *